United States Patent
Wilson et al.

(10) Patent No.: US 10,870,314 B2
(45) Date of Patent: Dec. 22, 2020

(54) FIXTURE FOR SPOKE TO SHEAR BAND ATTACHMENT FOR A NON-PNEUMATIC TIRE WITH SPOKE PRE-COMPRESSION

(71) Applicant: Compagnie Generale des Etablissements Michelin, Clermont-Ferrand (FR)

(72) Inventors: Brian D Wilson, Greer, SC (US); Eric Rivers, Greenville, SC (US); David Alan Goodenough, Bridgman, MI (US); Glenn Andrew Schimidke, Smyrna, TN (US); Robert Gaut, Powdersville, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 88 days.

(21) Appl. No.: 16/463,888

(22) PCT Filed: Dec. 28, 2017

(86) PCT No.: PCT/US2017/068760
§ 371 (c)(1),
(2) Date: May 24, 2019

(87) PCT Pub. No.: WO2018/126037
PCT Pub. Date: Jul. 5, 2018

(65) Prior Publication Data
US 2019/0283500 A1    Sep. 19, 2019

Related U.S. Application Data

(63) Continuation of application No. PCT/US2017/069428, filed on Dec. 30, 2016.

(51) Int. Cl.
*B60B 31/00*    (2006.01)
*B60B 9/26*    (2006.01)
(Continued)

(52) U.S. Cl.
CPC .............. *B60B 31/005* (2013.01); *B60B 1/14* (2013.01); *B60B 5/02* (2013.01); *B60B 9/26* (2013.01);
(Continued)

(58) Field of Classification Search
CPC .... B60B 1/06; B60B 1/14; B60B 9/26; B60B 31/005; B60B 2310/318; B60B 2320/12;
(Continued)

(56) References Cited

U.S. PATENT DOCUMENTS 39,275  A  *  7/1863  Cook ................... B60B 31/005
                                                              157/2
103,669  A       5/1870  Shogren
(Continued)

FOREIGN PATENT DOCUMENTS

CN    202911477 U    5/2013
JP    H0796708 A    4/1995
(Continued)

OTHER PUBLICATIONS

European Patent Office; International Search Report and Written Opinion for patent application PCT/US2016/069428; dated Oct. 30, 2017; Publisher: European Patent Office, Rijswijk, Netherlands, pp. 1-12, enclosed.

(Continued)

*Primary Examiner* — Matthew P Travers
(74) *Attorney, Agent, or Firm* — Neal P. Pierotti

(57) ABSTRACT

An apparatus for assembling a non-pneumatic tire is provided that includes a plurality of spokes attached to a hub, a frame, and a plurality of mechanical elements disposed between and engaging successive spokes. The spokes extend to locations radially inward and radially outward of the locations of engagement with the mechanical elements. A radial movement member moves the mechanical elements in (Continued)

a radial direction. The spokes are compressed by the mechanical elements, and retaining elements engage the mechanical elements to hold them and the spokes in this position. Release by the retaining elements and outward radial movement of the mechanical elements urge the spokes toward a shear band that is outward in the radial direction. Adhesive located between the spokes and the shear band is pressed there between through this urging to result in the spokes being attached to the shear band in a state of pre-compression.

14 Claims, 8 Drawing Sheets

(51) Int. Cl.
| | | |
|---|---|---|
| | *B60B 23/00* | (2006.01) |
| | *B60B 1/14* | (2006.01) |
| | *B60B 1/06* | (2006.01) |
| | *B60C 7/14* | (2006.01) |
| | *B60C 7/24* | (2006.01) |
| | *B60B 5/02* | (2006.01) |

(52) U.S. Cl.
CPC ............... *B60B 23/00* (2013.01); *B60B 1/06* (2013.01); *B60B 2310/318* (2013.01); *B60C 7/24* (2013.01); *B60C 2007/146* (2013.01)

(58) Field of Classification Search
CPC ........ B60B 2320/122; B60C 2007/146; B60C 7/24; B60C 25/0503; B60C 25/0515; B60C 25/0533; B60C 25/0539; Y10T 29/49494; Y10T 29/49513–49517; Y10T 29/53448

See application file for complete search history.

(56) References Cited

U.S. PATENT DOCUMENTS

| | | | |
|---|---|---|---|
| 4,108,233 A | | 8/1978 | Baer et al. |
| 2014/0070439 A1 | | 3/2014 | Martin |
| 2018/0170128 A1 | * | 6/2018 | Gonzaga ............. B60C 25/0539 |
| 2019/0001745 A1 | * | 1/2019 | Delfino .................... B60C 7/14 |

FOREIGN PATENT DOCUMENTS

| | | | | |
|---|---|---|---|---|
| JP | 2011025759 A | | 2/2011 | |
| WO | WO-2017116463 A1 | * | 7/2017 | ............... B60B 1/04 |

OTHER PUBLICATIONS

European Patent Office; International Search Report and Written Opinion for patent application PCT/US2017/068760; dated Mar. 27, 2018; Publisher: European Patent Office, Rijswijk, Netherlands, pp. 1-11, enclosed.

* cited by examiner

FIXTURE FOR SPOKE TO SHEAR BAND ATTACHMENT FOR A NON-PNEUMATIC TIRE WITH SPOKE PRE-COMPRESSION

CROSS-REFERENCE TO RELATED APPLICATIONS

The present application is a 35 U.S.C. § 371 application of PCT/US17/68760 filed on Dec. 28, 2017 and entitled "Fixture for Spoke to Shear Band Attachment for A Non-Pneumatic Tire with Spoke Pre-Compression." PCT/US17/68760 claims the benefit of PCT/US16/69428 filed on Dec. 30, 2016 and entitled "Fixture for Spoke to Shear Band Attachment for a Non-Pneumatic Tire with Spoke Pre-Compression." PCT/US17/68760 and PCT/US16/69428 are both incorporated by reference herein in their entireties for all purposes.

FIELD OF THE INVENTION

The subject matter of the present invention relates to fixtures for the production of non-pneumatic tires. More particularly, the present application involves a fixture that includes mechanical elements that apply compression to the spokes before the spokes are pressed onto the interior of the shear band to result in a non-pneumatic tire with spoke pre-compression.

BACKGROUND OF THE INVENTION

Non-pneumatic tires are those that do not require air. These tires instead feature a hub that is mounted onto a wheel of a vehicle, and a series of spokes that extend radially outward from the hub. The spokes can be attached to a shear band that includes tread of the tire. The various components can be individually manufactured and then subsequently attached to one another. It is known to manufacture the spokes and then stretch them when they are attached to the hub and shear band. This stretching imparts pre-tension into the spokes of the non-pneumatic tire. Pre-tensioning may be beneficial in that the stretched spokes can go through zero, or less severe, cycles of tension and compression in rotation of the non-pneumatic tire during normal use to result in less fatigue imparted onto the spokes during the life of the non-pneumatic tire. Pre-tensioning of the spokes can also affect the stress-strain curve of the material making up the spokes to further allow for optimization of the non-pneumatic tire. Although it is known to apply pre-tensioning to spokes of a non-pneumatic tire to improve or adjust performance, it is not known to provide the spokes with types of forces other than pre-tensioning. Further, a device capable of imparting such forces on a non-pneumatic tire in its construction along with a particular manner of assembly of such a non-pneumatic tire is not known.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
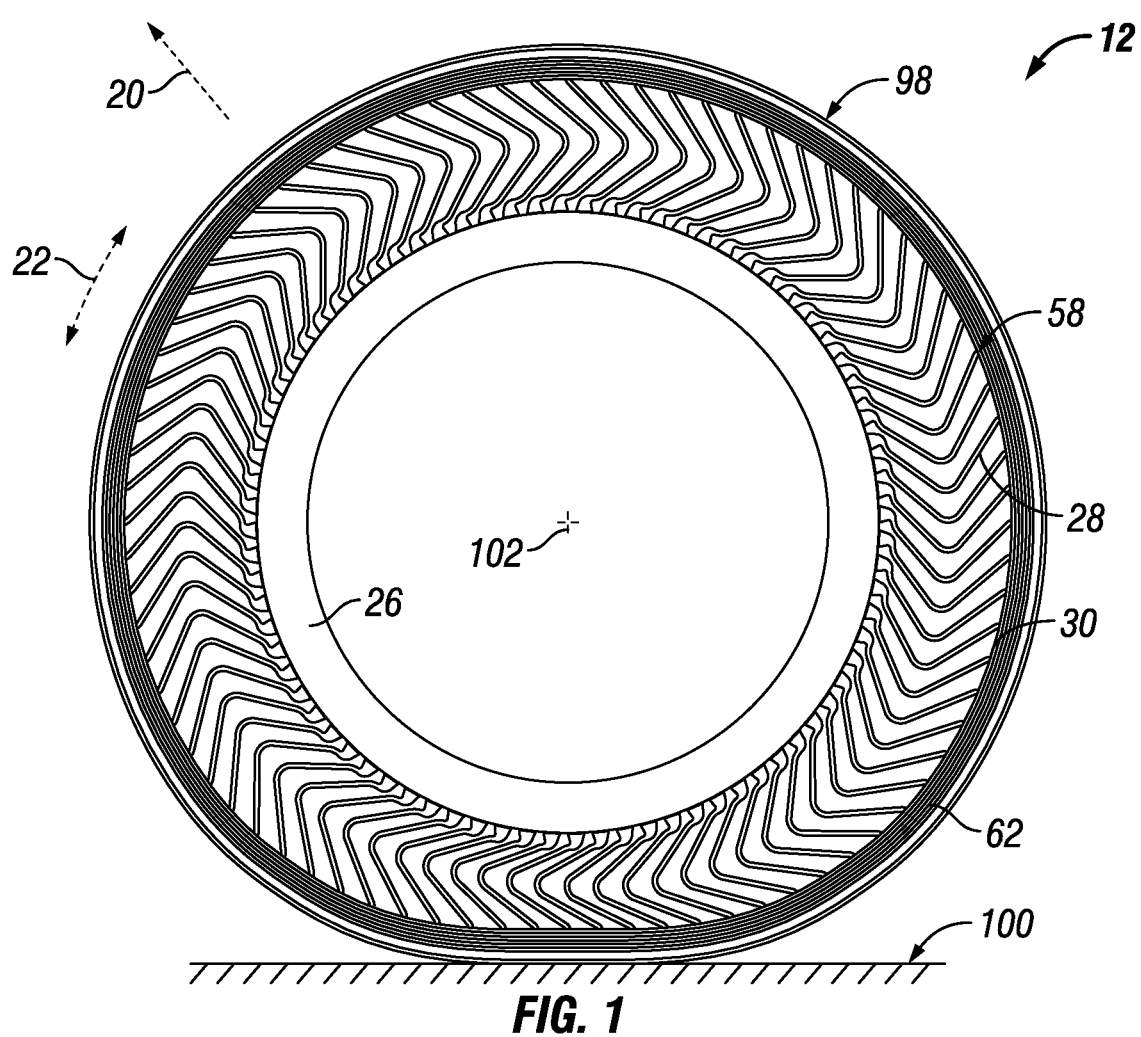
FIG. 1 is a side view of a non-pneumatic tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that is used in the construction of a non-pneumatic tire 12. A hub 26 with attached spokes 28 is placed between each one of a series of mechanical elements 16 that are arranged in a circumferential direction 22 about a central axis 18. A radial movement member 32 is actuated and pushes the mechanical elements 16 inward in the radial direction 20 which in turn causes the spokes 28 to move inward in the radial direction 20 to a compressed inward configuration 36. Retaining elements 38 are then used to secure the mechanical elements 16 and spokes 28 into the inward configuration 36 while the apparatus 10 is adjusted so that a shear band 62 can be located therein. Adhesive 30 is applied to the outer ends of the spokes 28, and the retaining elements 38 are released and the spokes 28 are pushed against the shear band 62 and pressed thereon until the adhesive 30 is cured. The radius 60 of the spokes 28 is larger than the radius 66 of the shear band 62 so that the resulting non-pneumatic tire 12 features spokes 28 that are in pre-compression.

FIG. 1 shows a non-pneumatic tire 12 in accordance with one exemplary embodiment. The non-pneumatic tire 12 has an axis 102 at its center, and the radial direction 20 extends from the axis 102. Tread 98 is located on the outer exterior of a shear band 62 and extends all the way around the non-pneumatic tire 12 in the circumferential direction 22. The shear band 62 is located inward in the radial direction 20 from the tread 98 and likewise extends 360 degrees around the axis 102 in the circumferential direction 22. A series of spokes 28 engage the shear band 62 and extend inward in the radial direction 20 from the shear band 62 to a hub 26 of the non-pneumatic tire 12. Any number of spokes 28 can be present, and their cross-sectional shape can be different from that shown. In some embodiments, from 64-80 spokes 28 are present in the non-pneumatic tire 12. The hub 26 is located inward from the spokes 28 in the radial direction 20 and can be mounted onto a wheel of the vehicle. The spokes 28 at the top of the non-pneumatic tire 12 could be pulled into tension, and the spokes 28 at the bottom are in compression as the non-pneumatic tire 12 rests on the ground 100 and as the non-pneumatic tire 12 turns in normal operation of the vehicle.

Figure 2:
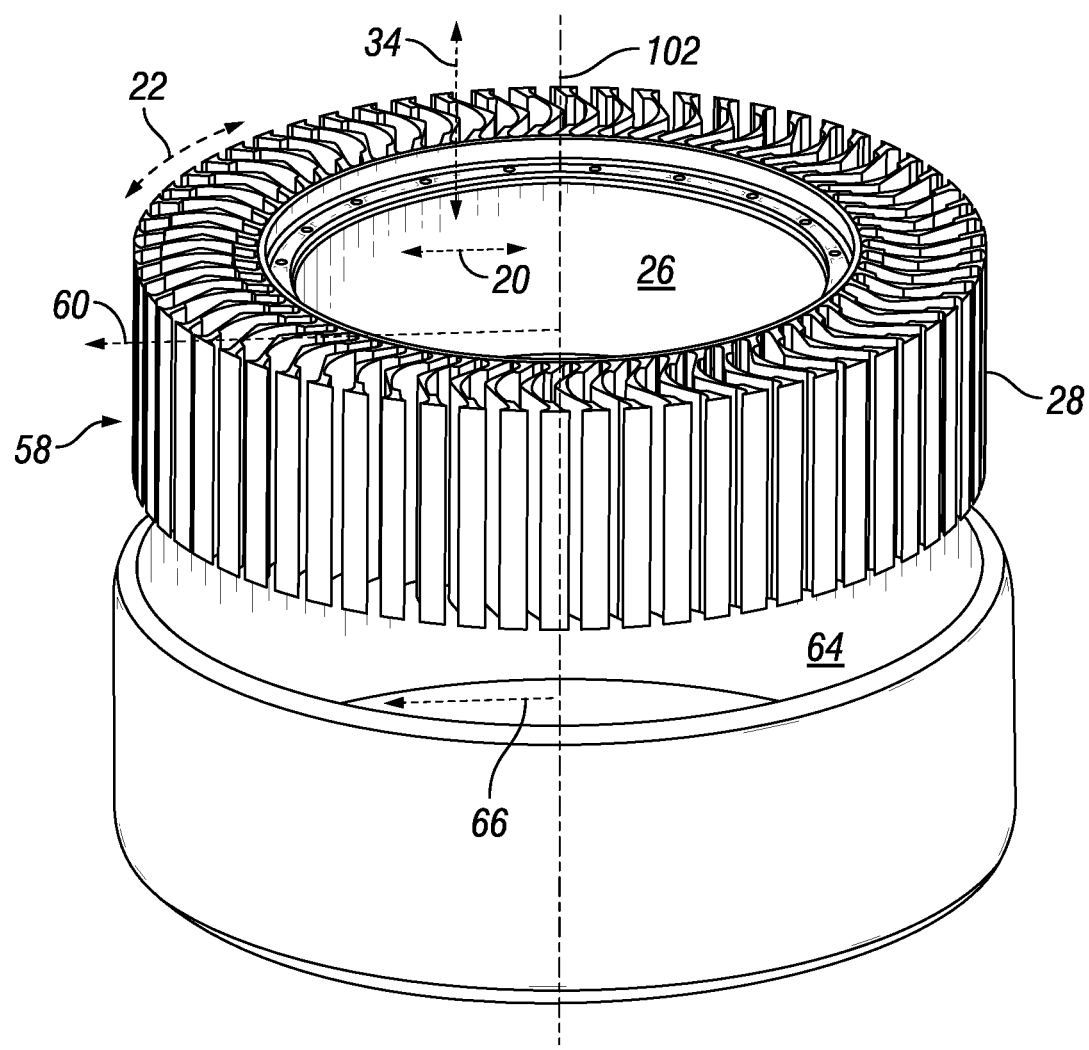
FIG. 2 is a perspective view of a spoke-hub subassembly with a larger radius than an inner surface of a shear band to which the spoke-hub assembly is to be attached.

FIG. 2 shows the hub 26 and the spokes 28 as a sub-assembly of the non-pneumatic tire 12 positioned next to a shear band 62 to which they are to be attached. The hub 26 and spokes 28 can be separately formed and then subsequently attached to one another before they are incorporated into the apparatus 10. The spokes 28 are arranged around the axis 102 in the circumferential direction 22 and the outer radial ends 58 of the spokes 28 are located at a radius 60 from the axis 102. The shear band 62 has an inner surface 64 onto which the outer radial ends 58 are to be attached in construction of the non-pneumatic tire 12. The inner surface 64 is located at a radius 66 from the axis 102. In the relaxed, uncompressed and unattached states of the spokes 28 and the shear band 62, the radius 60 is greater than the radius 66. This being the case, the spokes 28 will need to be compressed in order to fit them within the shear band 62. Once attached, the spokes 28 will be pre-compressed in the non-pneumatic tire 12 upon completion of the construction of the non-pneumatic tire 12.

Figure 3:
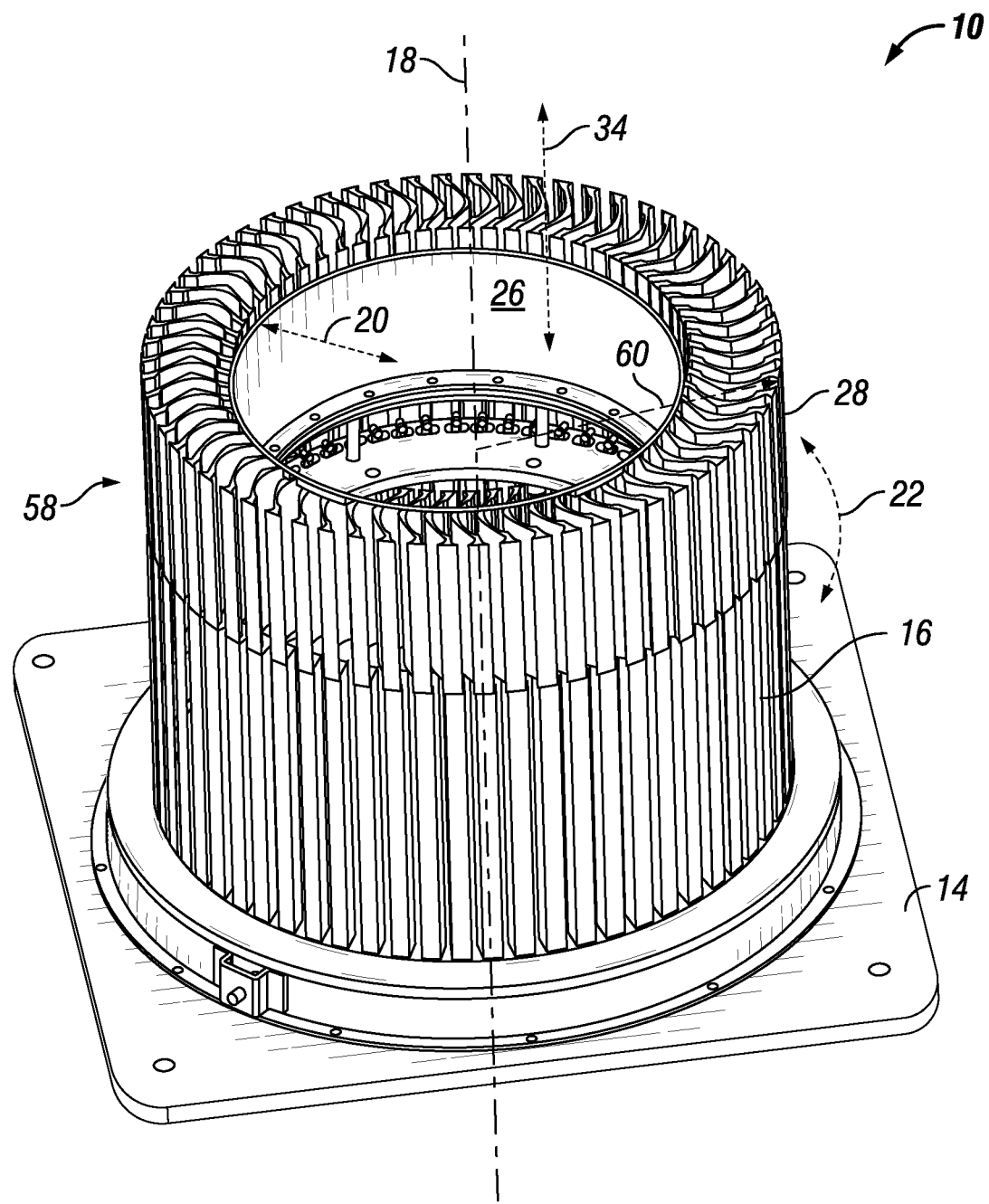
FIG. 3 is a perspective view of lower portions of a frame and mechanical elements with the spokes being inserted down onto the mechanical elements.

Additional portions of the apparatus 10 are shown in FIG. 3 and include the frame 14 and a plurality of mechanical elements 16 that are spaced from the central axis 18 in the radial direction 20 and are arranged around the central axis 18 in the circumferential direction 22. The frame 14 includes various plates, columns, bolts, rings, and other structure that supports components of the apparatus 10 such as the mechanical elements 16, shear band 62, retaining elements 38, hub 26 and spokes 28. The frame 14 can be variously arranged and made of a variety of materials in accordance with different exemplary embodiments of the apparatus 10. The longitudinal direction 34 extends in the same direction as the central axis 18 and may be parallel to the central axis 18. The mechanical elements 16 are each spaced from one another in the circumferential direction 22 and extend upwards from a base portion of the frame 14 in the longitudinal direction 34. The hub 26 and attached spokes 28 are shown as being lowered down onto the mechanical elements 16 in the longitudinal direction 34 and are not completely lowered down onto the frame 14. The spokes 28 each fit between one of the successive mechanical elements 16 so that the resulting arrangement includes alternating spokes 28 and mechanical elements 16 in the circumferential direction 22 all the way, 360 degrees, around the central axis 18. Alignment of the spokes 28 with the mechanical elements 16 can be accomplished using a guide system, if desired, to cause the spokes 28 to be placed between each one of the mechanical elements 16.

Figure 4:
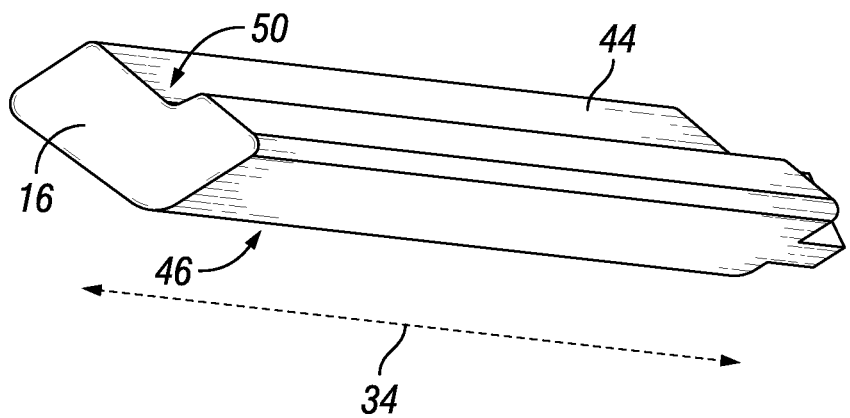
FIG. 4 is a perspective view of a mechanical element.

One of the mechanical elements 16 is shown in greater detail with reference to FIG. 4. The mechanical element 16 is elongated in the longitudinal direction 34 so that it is longer in this direction than any other direction 20, 22. The mechanical element 16 has a cross-sectional shape that matches the shape of voids present between successive spokes 16. Although shown as being L-shaped, it is to be understood that the mechanical elements 16 can be variously shaped in other exemplary embodiments as per the corresponding shapes of the spokes 28. As shown, the mechanical element 16 has a first notch 46 that extends in the longitudinal direction 34 and is located at the lower left hand side of the "L." The mechanical element 16 also has a second notch 50 that is formed at the interior of the two L-shaped legs and is located roughly opposite from the first notch 46. If all of the spokes 28 are the same in the non-pneumatic tire 12 and are all spaced evenly about the central axis 18 the mechanical elements 16 may be sized and shaped the same. However, if the spokes 16 are shaped differently or are spaced differently from one another in the circumferential direction 22, then the mechanical elements 16 of the apparatus 10 may not all be shaped the same or may not all be spaced the same from one another in the circumferential direction 22. However, in some instances the shape or spacing of the spokes 28, even if different, may allow for some play in their manipulation such that the mechanical elements 16 may all be spaced the same and shaped the same as one another. Alternatively, differently spaced/sized mechanical elements 16 can be used in an apparatus 10 with spokes 28 that are all the same shape and spaced the same amount as the particular spoke 28 arrangement may allow for some play in the application of the mechanical elements 16. The mechanical element 16 can be made of various materials such as steel or aluminum.

Figure 5:
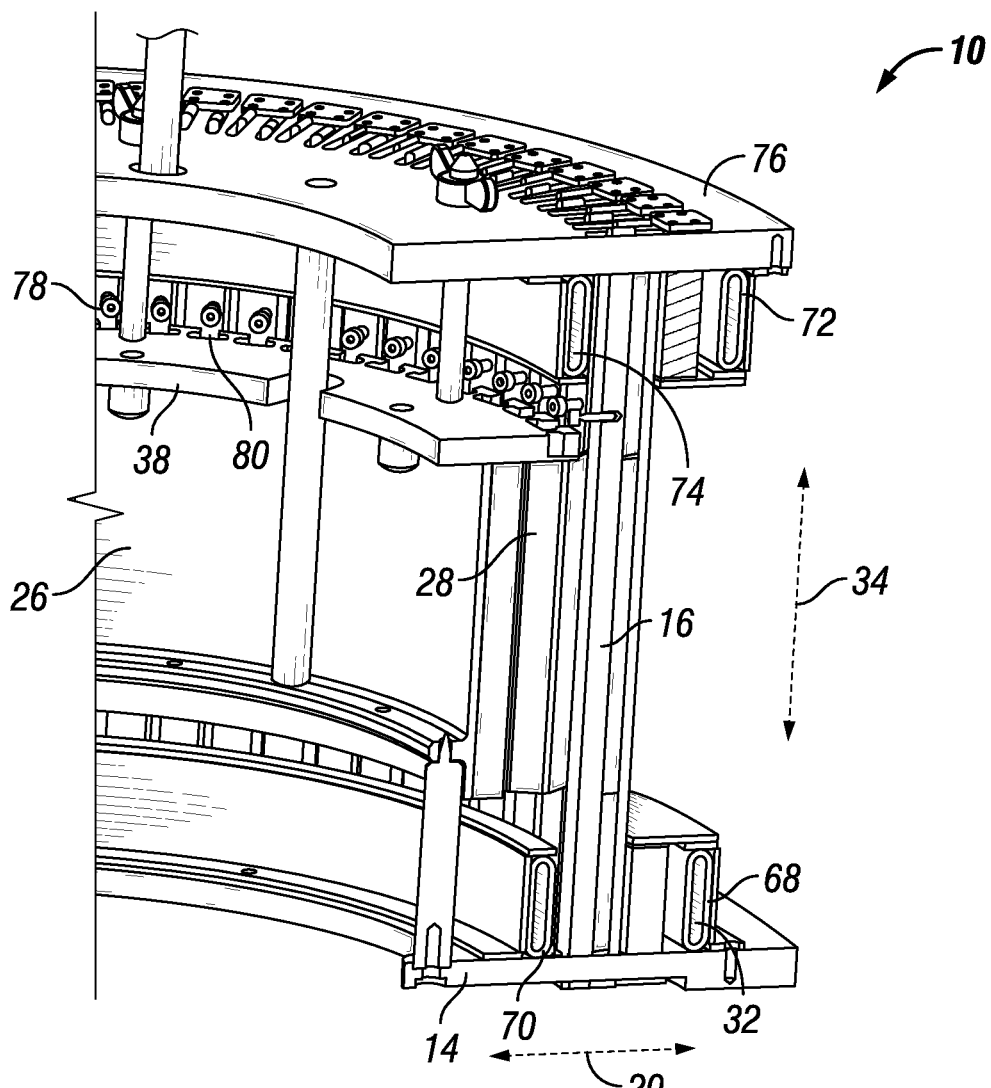
FIG. 5 is a sectioned view of the apparatus with the hub and spokes inserted just before spoke compression to a compressed state.
Figure 6:
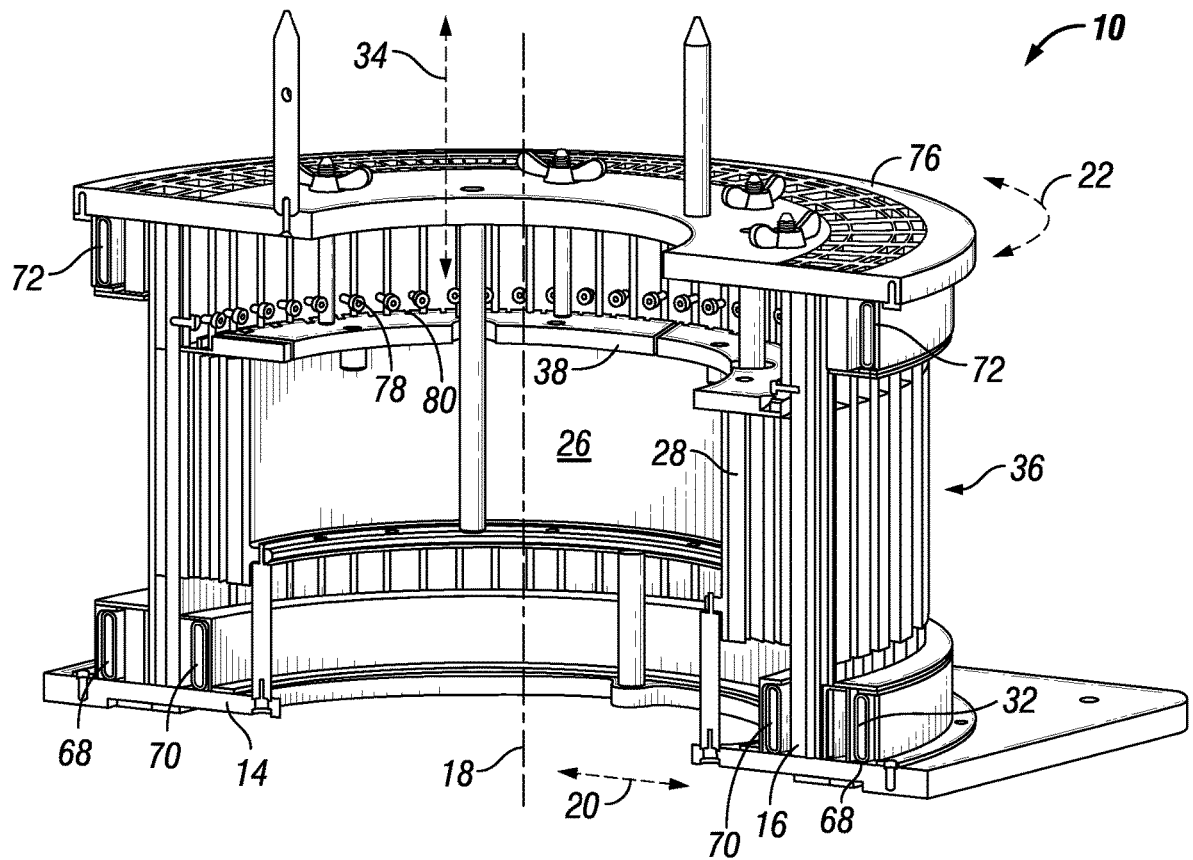
FIG. 6 is a sectioned view of the apparatus with the outer bladders actuated in order to move the spokes to the compressed state.

The hub 26 and attached spokes 28 are shown completely inserted into the apparatus 10 in FIGS. 5 and 6. The hub 26 and spoke 28 can be moved in the longitudinal direction 34 until an inner ring of the hub 26 engages a portion of the frame 14 in which the hub 26 can be bolted or otherwise attached to pins of the frame 14 so that the hub 26 is held stationary with respect to the frame 14. The frame 14 can include a compression end plate 76 that is inserted onto the frame 14 after the hub 26 and spokes 28 are located within the apparatus 10. The compression end plate 76 can be secured to structure of the frame 14, such as columns, and once attached a radial movement member 32 of the apparatus 10 can be actuated to cause the spokes 28 to be moved into an inward configuration 36. The radial movement member 32 functions by moving the mechanical elements 16 that in turn act upon the spokes 28 to cause the spokes 28 to move inward or outward in the radial direction 20. The radial movement member 32 can include components such as hydraulic pistons, gears, motors, bladders, linear actuators or any other parts capable of effecting movement of the mechanical elements 16. In the exemplary embodiment shown, the radial movement member 32 incorporates four bladders 68, 70, 72 and 74 that can be actuated by air, gas, or any other fluid.

The first outer bladder 68 is positioned onto the bottom of the frame 14 and is located outward in the radial direction from the first inner bladder 70. A portion of the mechanical elements 16 are between the bladders 68, 70. The spokes 28 are spaced from the bladders 68, 70 in the longitudinal direction 34 and are not located at the same longitudinal positions as the bladders 68, 70. A second outer bladder 72 is carried by the compression end plate 76, and a second inner bladder 74 is likewise carried by the frame 14 and is located inward in the radial direction 20 from the second outer bladder 72. Additional portions of the mechanical elements 16 are located between the second outer bladder 72 and the second inner bladder 74 in the radial direction 20. The spokes 28 are again spaced from the bladders 72, 74 in the longitudinal direction 34, and no portions of the spokes 28 are located at the same longitudinal positions as the second outer bladder 72 and the second inner bladder 74. The spokes 28 engage the mechanical elements 16 at locations in the longitudinal direction 34 that are between and not at the bladders 68, 70 and the bladders 72, 74. The spokes 28 can be free from engagement with the frame 14 in some embodiments and thus only engage the hub 26 and the mechanical elements 16.

The apparatus 10 also includes a retaining element 38 that is mounted to the frame 14. In some embodiments, the retaining element 38 is a portion of the compression end plate 76 that can be attached to bottom elements of the frame 14, or even in some instance mounted by columns onto the hub 26. The retaining element 38 is unactuated in FIGS. 5 and 6 such that they do not retain the mechanical elements 16 into any particular position. The retaining element 38 extends completely around the central axis 18 in the circumferential direction 22 and is mounted to the frame 14 so as to be able to move in the longitudinal direction 34 with respect to the frame 14. The retaining element 38 may be a single plate, or can be multiple plates in different arrangements. Movement of the retaining element 38 can be accomplished by pneumatic cylinders, ball screws, linear actuators, a hydraulic system, screws that can be hand or automatically tightened, or any other mechanism. Rods that may or may not have threading are part of the frame 14 and extend in the longitudinal direction 34, and the retaining element 38 can move along these rods from the unactuated position shown in FIGS. 5 and 6 to an actuated position in which the retaining element 38 is located higher than as shown in FIGS. 5 and 6. The retaining element 38 on its outer edge in the radial direction 20 features a series of receiving grooves 80 that are slots that have a profile that matches a profile of pins 78 that have a head and a shaft. The pins 78 are each located onto one of the mechanical elements 16 at the inner sides of the mechanical elements 16 in the radial direction 20. When the retaining elements 38 are moved upwards in the longitudinal direction 34, the pins 78 are received into the receiving grooves 80 of the retaining elements 38 that fit around the head of the pins 78.

FIG. 5 shows the bladders 68, 70, 72 and 74 in an unactuated state in which they are not inflated and in which the spokes 28 are at the same orientation and length in the radial direction 20 as they were before in FIG. 2 prior to introduction onto the mechanical elements 16. The first outer and inner bladders 68, 70 may be contained within chambers of the frame 14 and are present in all configurations of the apparatus 10. The second outer bladder 72 can be contained within a chamber of the compression end plate 76 and thus can be removable from other portions of the frame 14. The second inner bladder 74 may be contained within the compression end plate 76 and likewise removable, or may be contained within a chamber of the frame 14 and not removable. The bladders 68, 70, 72 and 74 are unactuated in FIG. 5. FIG. 6 shows the first and second outer bladders 68 and 72 actuated such that they expand within their respective chambers and push inward in the radial direction 20. The outer bladders 68, 72 upon expansion engage and urge the mechanical elements 16 inward in the radial direction 20 which in turn causes the spokes 28 to be urged inward in the radial direction 20. The use of two outer bladders 68, 72 allows for a balancing of the forces applied to the mechanical elements 16 as they are located on either end of the longitudinally extending mechanical elements 16. However, in other arrangements only a single outer bladder 68 or 72 may be employed.

In some instances, the second inner bladder 74 is not present at this point in the apparatus 10. The second inner bladder 74 could be provided at a later stage of the assembly process. Alternatively, the second inner bladder 74 could be present in the frame 14 when the outer bladders 68, 72 are expanded and the mechanical elements 16 pushed inwards. Inward movement of the mechanical elements 16 results in inward movement of the pins 78 in the radial direction 20 which positions the pins 78 directly over counterpart receiving grooves 80 of the retaining elements 38.

Figure 7:
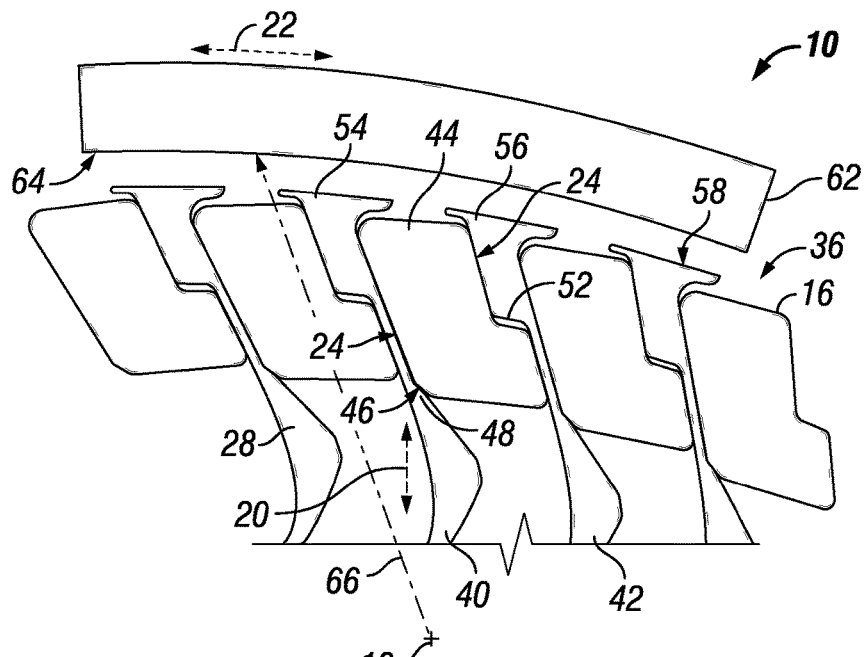
FIG. 7 is a top view of a portion of the spokes, mechanical elements, and shear band in which the spokes are in the compressed state.

FIG. 7 shows five of the mechanical elements 16 in relation to four of the spokes 28 and a portion of the shear band 62. The mechanical elements 16 are moved as far as possible inward in the radial direction 20 to result in the spokes 28 being pushed inward into an inward configuration 36. Each one of the mechanical elements 16 simultaneously engages two successive spokes 28 in the inward configuration 36, and in other configurations of the spokes 28, and may engage them simultaneously at all times the spokes 28 are in the apparatus 10. One of the mechanical elements 16 is designated as a first mechanical element 44, and two successive spokes 28 are designated as the first spoke 40 and the second spoke 42. The first spoke 40 has a first projection 48, and a first notch 46 of the first mechanical element 44 receives the first projection 48. The first projection 48 can be within the first notch 46 when the first mechanical element 44 pushes the first spoke 40 into the inward configuration 36. The first mechanical element 44 also has a second notch 50 into which a second projection 52 of the second spoke 42 is received. The second projection 52 may be outside of the second notch 50 when the first mechanical element 44 is in the inward configuration 36 shown in FIG. 7. In other embodiments, the second projection 52 could be in the second notch 50 in the inward configuration 36.

The first mechanical element 44 has various locations of engagement 24 with the first and second spokes 40, 42. The spokes 40, 42 extend in the radial direction 20 beyond the locations of engagement 24 both inwardly and outwardly. In this regard, the first spoke 40 has an outer flange 54, and the second spoke 42 has an outer flange 56 that are outward from the first mechanical element 44 in the radial direction 20. Additionally, other portions of the first and second spokes 40, 42 are inward from the first mechanical element 44 in the radial direction 20. The first mechanical element 44 may thus be between the inward and outward radial ends of the spokes 40, 42 at all portions of the assembly process in accordance with various exemplary embodiments. The first mechanical element 44 is out of engagement with the outer flanges 54, 56 when in the inward configuration 36. The shear band 62 is shown for reference in FIG. 7, but need not be present when the spokes 28 are placed into the inward configuration 36 shown in FIG. 7. The rest of the mechanical elements 16 and spokes 28 can be configured in the same way as previously described with reference to the first spoke 40, the second spoke 42, and the first mechanical element 44.

Figure 8:
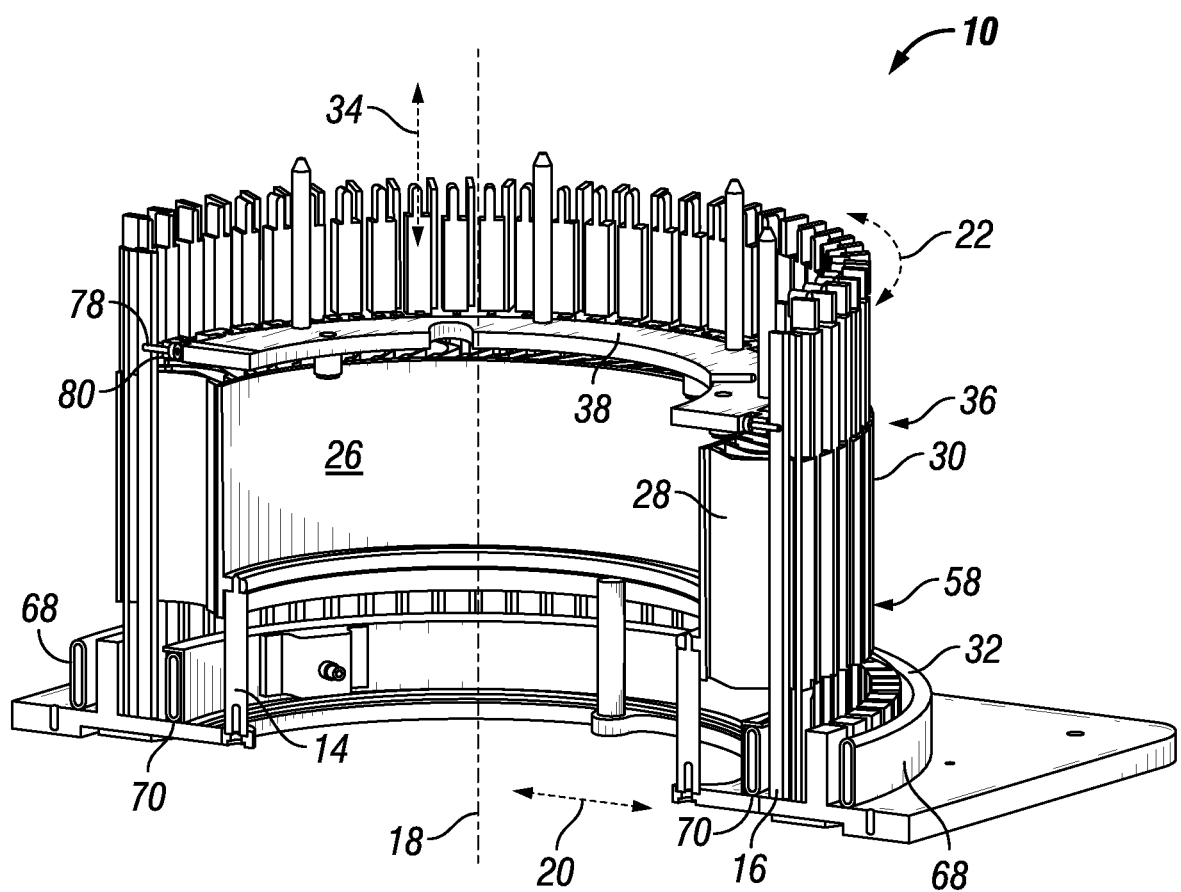
FIG. 8 is a sectioned view of the apparatus with the retaining elements engaged with the mechanical elements to hold the spokes in the compressed state.

Once the outer bladders 68, 72 are actuated and the spokes 28 are placed into the inward configuration 36, the retaining elements 38 may be employed to lock the radial position of the mechanical elements 16, and thus the spokes 28, into this position. FIG. 8 shows the spokes in the inward configuration 36 in which the pins 78 on the mechanical elements 16 are moved over the receiving grooves 80 so that they are aligned in the radial direction 20, and the retaining elements 38 are moved upward in the longitudinal direction 34 so that pins 78 are placed within the receiving grooves 80. The receiving grooves 80 have features that block the head of the pins 78 from moving outward in the radial direction 20. The pressure in the outer bladders 68, 72 can be released so that the mechanical elements 16 are no longer urged inward in the radial direction 20. The compressed spokes 28 will have a tendency to spring back outwards in the radial direction 20, but the retaining element 38 will hold the mechanical elements 16, and thus the spokes 28, in the inward configuration 36. At this point, the compression end plate 76 can be removed, which results in the removal of the second outer bladder 72. In some arrangements, the second inner bladder 74 may also be removed. Adhesive 30 can be applied to the outer radial ends 58 of the spokes 28, which are the portions of the spokes 28 farthest from the central axis 18 in the radial direction 20.

The mechanical elements 16 move inward in the radial direction 20 to compress the spokes 28 without damage to the spokes 28 or hub 16. The compressed spokes 28 that include the outer radial ends 58 should be accurately positioned in the longitudinal direction 34, circumferential direction 22, and radial direction 20 within an accuracy of plus or minus 0.3 millimeters to allow for the adhesive 30 to be properly applied. The spoke 28 compression should be sufficient to prevent displacement of the adhesive 30 bead during the assembly.

Figure 9:
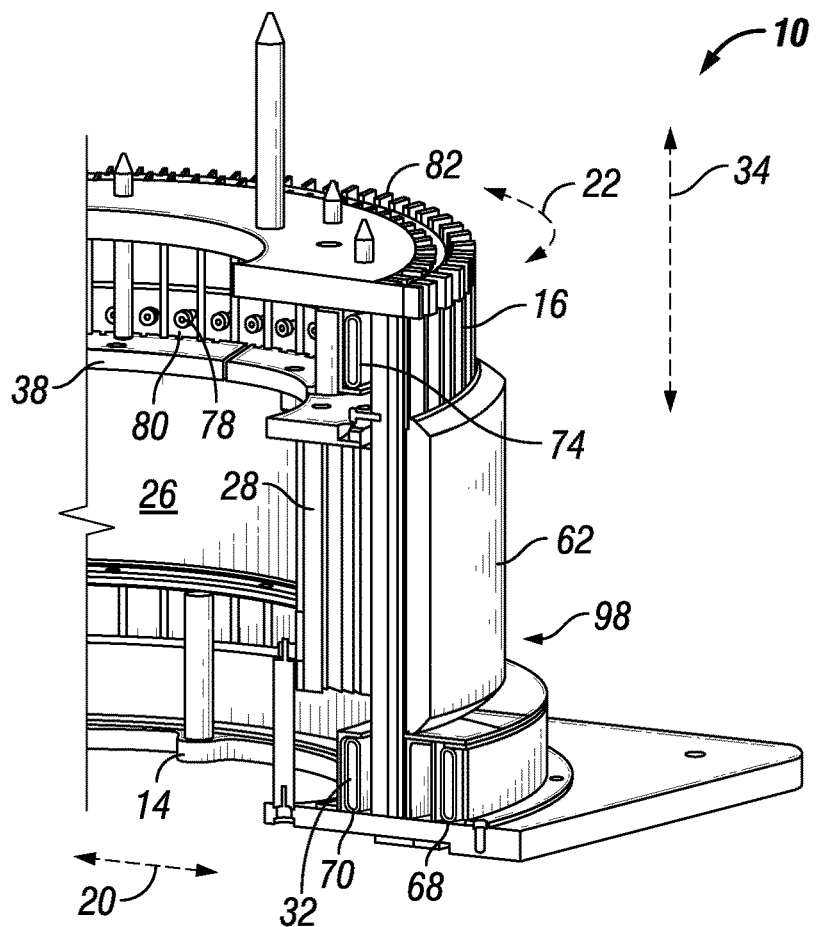
FIG. 9 is a sectioned view of the apparatus with the compression plate removed and the shear band inserted with the inner bladders actuated to urge the spokes towards the shear band.

After application of the adhesive 30, the shear band 62 can be positioned around the spokes 28. The removal of the compression end plate 76 and the attached second outer bladder 72 provides room for the shear band 62 to be slid down onto the frame 14 as shown in FIG. 9. The shear band 62 may rest onto a plate or ring of the frame 14. An expansion end plate 82 can be installed onto the frame 14 after insertion of the shear band 62. The expansion end plate 82 may include the second inner bladder 74 if this component is not a permanent component of the frame 14. Once the expansion end plate 82 is installed and fixed into place, the retaining elements 38 can release the mechanical elements 16 to allow them to move outward in the radial direction 20. Likewise, the first and second inner bladders 70, 74 can be inflated to force the mechanical elements 16 outward in the radial direction 20 and to in turn push the spokes 28 outward in the radial direction 20 and against the inner surface 64 of the shear band 62. The first outer bladder 68, and the second outer bladder 72 if present, has their bladder pressures reduced to zero in order to allow the inner bladders 70, 74 to be able to expand the spokes 28 outward. The spokes 28 can be urged against the shear band 62 until the adhesive 30 cures. Additionally or alternatively, instead of placing the adhesive 30 on the outer radial ends 58, the adhesive 30 could be placed on the inner surface 64 in certain arrangements.

In some arrangements, the compression end plate 76 can include both the second inner bladder 74 and the retaining elements 38. The second outer bladder 72 could be a part of the compression end plate 76, and may be removed from the compression end plate 76 in order to allow the shear band 62 to be placed onto the fixture next to the mechanical elements 16. The remaining portions of the compression end plate 76 can thus be called and described as the expansion end plate 82. In yet other embodiments, the shear band 62 could be installed before the compression end plate 76 is installed. This would allow for compression both outwardly and inwardly in the radial direction 20 with the shear band 62 present and all of the bladders 68, 70, 72, 74 present. Once formed, the only portion that would need to be removed to extract the non-pneumatic tire 12 would be the compression end plate 76/expansion end plate 82 that includes the retaining elements 38, second outer bladder 72, and second inner bladder 74.

The retaining elements 38 are lowered in the longitudinal direction 34 to cause them to release the pins 78 and thus release the mechanical elements 16. This release may take place before, after, or at the same time as the inflation of the first and second inner bladders 70, 74. These inner bladders 70, 74 are inflated in FIG. 9, and push the mechanical elements 16 above and below the spokes 28 outward in the radial direction 20. The first outer bladder 68 is not actuated and is not inflated when the inner bladders 70, 74 are inflated and urge the spokes 28 radially outward. The apparatus 10 may remain in the configuration shown in FIG. 9 for a length of time sufficient to cure the adhesive 30.

Figure 10:
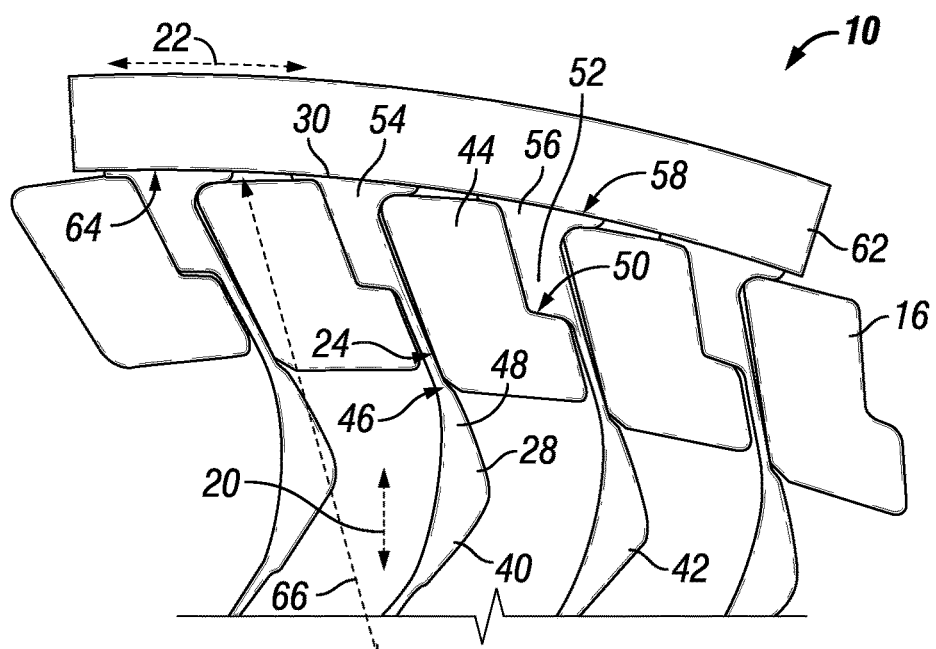
FIG. 10 is a top view of a portion of the spokes, mechanical elements, and shear band in which the spokes are pressed against the shear band.

FIG. 10 shows the mechanical elements urged outward in the radial direction 20 by the mechanical elements 16 to the fullest extent possible so that the spokes 28 are urged against the shear band 62. In this orientation, the first notch 46 is displaced from the first projection 48 so that the first projection 48 is not within the first notch 46. The second projection 52 is within the second notch 50, and the first mechanical element 44 engages both the first and second spokes 40, 42. The first mechanical element 44 engages both the outer flange 54 of the first spoke 40, and the outer flange 56 of the second spoke 42. The outer flanges 54, 56 are squeezed between the first mechanical element 44 and the inner surface 64 and the adhesive 30 between the outer radial ends 58 and the inner surface 64 is likewise compressed. Heat may be applied, along with this compression, to cure the adhesive 30 and cause attachment of the spokes 28 to the shear band 62. The remaining spokes 28 and mechanical elements 16 can be configured in the same manner as the first spoke 40, the second spoke 42, and the first mechanical element 44 as previously discussed.

Figure 11:
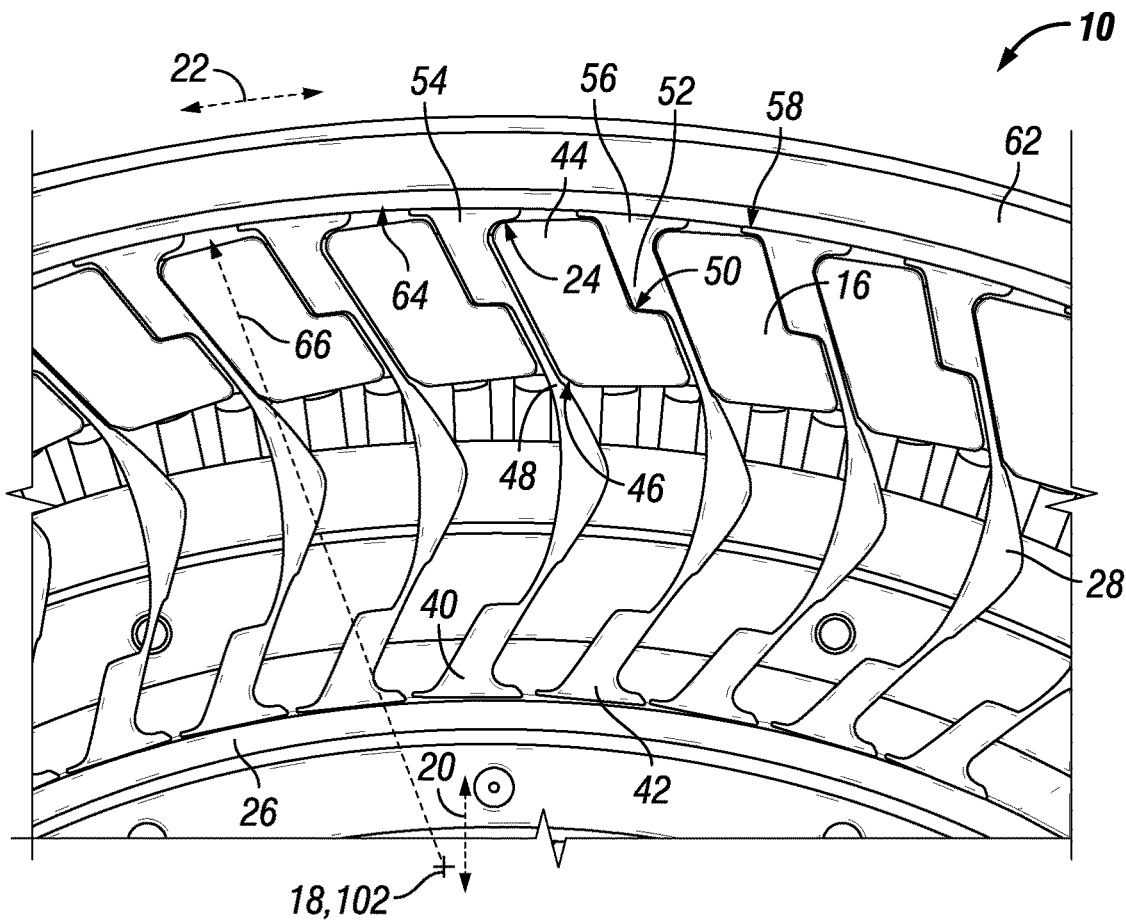
FIG. 11 is a top view of a portion of the apparatus in which the spokes are urged against the inner surface of the shear band.

FIG. 11 is a view similar to FIG. 10 but with the inner radial ends of the spokes 28 shown and connected to the hub 26. The radius 66 of the inner surface 64 of the shear band 62 does not change during the assembly process as the shear band 62 may be a fairly rigid component that does not expand outward in the radial direction 20 upon the application of the force by the mechanical elements 16. The force applied by the mechanical elements 16 does not pull the spokes 28 from the hub 26. In the arrangement shown in FIG. 11, the first projection 48 is within the first notch 46, and the second projection 52 is within the second notch 50 when the spokes 28 are forced against the shear band 62. The mechanical elements 16 do not engage the inner surface 64 of the shear band 62 but are spaced therefrom by the presence of the flanges 54, 56 of the various mechanical elements 16. Although described as not moving outward in the radial direction 20 upon application of forces from the mechanical elements 16, in some instances the shear band 62 may in fact expand outwards in the radial direction 20 when the spokes 28 are urged against the inner surface 64 which may likewise expand outward.

The mechanical elements 16 are thus able to be transitioned from inward compression to outward spoke 28 compression against the shear band 62. The mechanical elements 16 maintain circumferential 22 and longitudinal 34 precision of location within plus or minus 0.2 millimeters upon the outer radial ends 58 contacting the inner surface 64 in order to maintain good uniformity. Variation in geometry of the spokes 28 is accounted for by the design of the apparatus 10. Application of force in the radial direction 20 by having bladders 68, 70, 72, 74 on both sides of the spokes 28 in the longitudinal direction 34 may afford a design that achieves the pressure necessary to compress the spokes 28 and press them 28 to the shear band 62.

Figure 12:
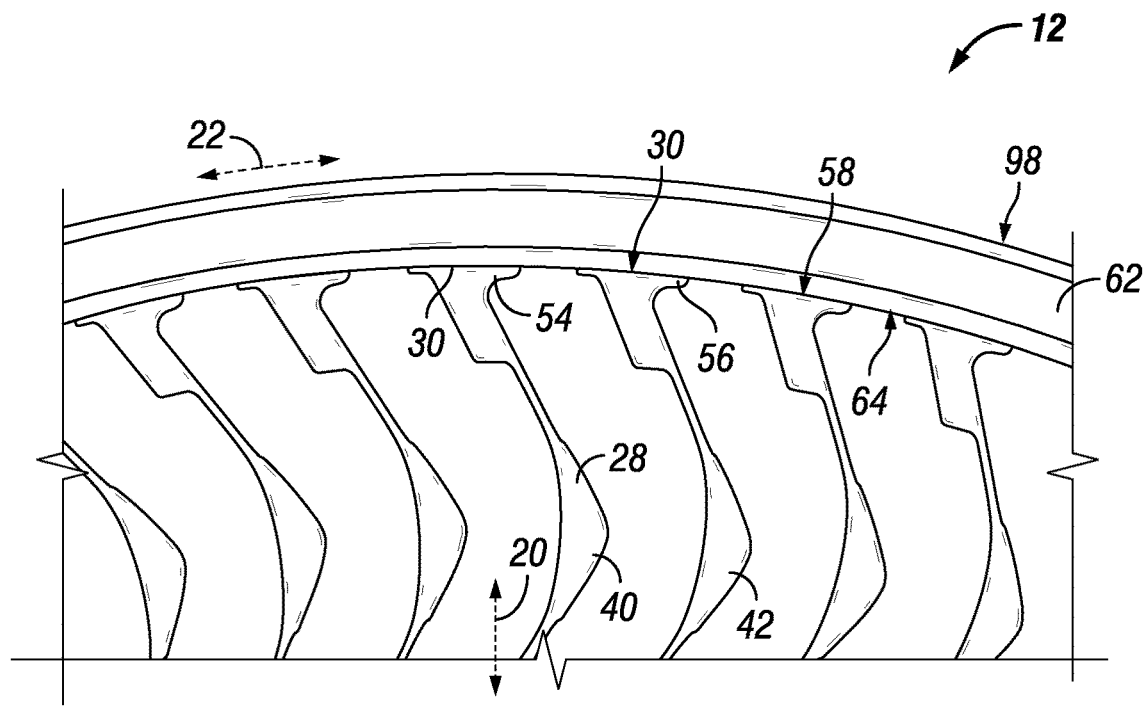
FIG. 12 is a side view of a portion of the non-pneumatic tire in which the spokes are in pre-compression.

Once the adhesive 30 is cured and the spokes 28 are attached to the shear band 62, the pressure in the first and second inner bladders 70, 74 is released to relax the force of the mechanical elements 16 against the shear band 62. The assembled hub 26, spokes 28 and shear band 62 are lifted in the longitudinal direction 34 relative to the mechanical elements 16 and are removed from the apparatus 10. A new hub 26 and spoke 28 sub-assembly may be subsequently inserted into the mechanical elements 16 for attachment to a subsequent shear band 62. FIG. 12 shows a portion of the assembled non-pneumatic tire 12 after being removed from the mechanical elements 16 so that no forces from the mechanical elements 16 are imparted thereon. As the radius 60 of the outer radial ends 58 of the spokes 28 in the unattached, relaxed state of the spokes 28 is greater than the radius 66 of the inner surface 64 of the shear band, and as the shear band 62 is less compliant than the spokes 28, the spokes 28 will be compressed within the shear band 62. The spokes 28 have a degree of pre-compression imparted thereon in their natural, unloaded state. In use, forces imparted onto the spokes 28 may act to further compress them, or may function to put them into tension instead of in compression as may be designed for the desired application.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for assembling a non-pneumatic tire, comprising:
    a hub;
    a plurality of spokes that are attached to the hub;
    a frame;
    a plurality of mechanical elements carried by the frame that are disposed about a central axis in a circumferential direction, wherein the central axis extends in a longitudinal direction, wherein the mechanical elements are disposed between successive spokes in the circumferential direction and wherein the mechanical elements engage the spokes at locations of engagement, wherein the spokes extend to locations radially inward and radially outward of the locations of engagement with the mechanical elements;
    a radial movement member that moves the mechanical elements in a radial direction relative to the frame, wherein the radial movement member moves the mechanical elements toward the central axis in the radial direction to an inward configuration to in turn move the spokes towards the central axis in the radial direction to result in the spokes being compressed;
    retaining elements that engage the mechanical elements when the mechanical elements are in the inward configuration to hold the mechanical elements in the inward configuration relative to the frame;
    a shear band located radially outward from the spokes when the spokes are compressed, wherein release of the mechanical elements by the retaining elements and outward radial movement of the mechanical elements by the radial movement member urges the spokes toward the shear band in the radial direction; and
    adhesive located between the spokes and the shear band that is pressed between the spokes and the shear band by the urging of the spokes toward the shear band in the radial direction by the mechanical elements acted on by the radial movement member, wherein the spokes are attached to the shear band in a state of pre-compression.

2. The system as set forth in claim 1, wherein the spokes have a first spoke and a second spoke that are adjacent to one another in the circumferential direction, wherein the mechanical elements have a first mechanical element, wherein the first mechanical element has a first notch into which a first projection of the first spoke is received when the first mechanical element moves inward in the radial direction, wherein the first mechanical element has a second notch into which a second projection of the second spoke is received when the first mechanical element moves outward in the radial direction.

3. The system as set forth in claim 1, wherein each one of the mechanical elements simultaneously engages two of the spokes during both inward and outward movement of the mechanical elements in the radial direction relative to the frame.

4. The system as set forth in claim 1, wherein each one of the spokes has an outer flange, wherein the mechanical elements engage the outer flanges of the spokes when the mechanical elements urge the spokes towards the shear band in the radial direction and press the adhesive between the spokes and the shear band.

5. The system as set forth in claim 1, wherein the spokes have an uncompressed state before the compression of the spokes by the mechanical elements, wherein outer radial ends of the spokes in the uncompressed state have a larger radius relative to the central axis than a radius of an inner surface of the shear band relative to the central axis.

6. The system as set forth in claim 1, wherein the radial movement member has a first outer bladder that upon expansion moves the mechanical elements inward in the radial direction, wherein the radial movement member has a first inner bladder that upon expansion moves the mechanical elements outward in the radial direction, wherein both the first outer bladder and the first inner bladder extend 360 degrees around the central axis in the circumferential direction.

7. The system as set forth in claim 6, wherein the radial movement member has a second outer bladder that upon expansion moves the mechanical elements inward in the radial direction, and wherein the radial movement member has a second inner bladder that upon expansion moves the mechanical elements outward in the radial direction, wherein both the second outer bladder and the second inner bladder extend 360 degrees around the central axis in the circumferential direction;
    wherein the spokes are at a location in the longitudinal direction that is intermediate the first outer bladder and the second outer bladder, and wherein the spokes are at a location in the longitudinal direction that is intermediate the first inner bladder and the second inner bladder.

8. The system as set forth in claim 7, further comprising a compression end plate that carries the second outer bladder, wherein the compression end plate is attached to the frame when the first and second outer bladders are actuated and the mechanical elements are moved inward in the radial direction, wherein the compression end plate and the second outer bladder are detached from the frame and removed from the frame when the shear band is located radially outward from the spokes and the first and second inner bladders are actuated and the mechanical elements are moved outward in the radial direction.

9. The system as set forth in claim 8, wherein the retaining elements are offset from the spokes in the longitudinal direction, and wherein the retaining elements are located inward in the radial direction from the shear band.

10. The system as set forth in claim 9, wherein the mechanical elements have pins, wherein the retaining elements move in the longitudinal direction relative to the mechanical elements, wherein the retaining elements have receiving grooves that receive the pins, wherein the retaining elements are moved in the longitudinal direction away from the spokes to engage the pins to hold the mechanical elements in the inward configuration relative to the base, wherein the retaining elements are moved in the longitudinal direction toward the spokes to disengage the pins to release the mechanical elements.

11. The system as set forth in claim 1, further comprising an expansion end plate that is mounted onto the frame when the shear band is located outward from the spokes in the radial direction, wherein the shear band is located outward from the expansion end plate in the radial direction.

12. The system as set forth in claim 1, wherein the adhesive is applied to outer radial ends of the spokes when the mechanical elements are in the inward configuration and when the spokes are compressed.

13. The system as set forth in claim 1, wherein the adhesive is cured while the spokes are urged toward the shear band in the radial direction by the mechanical elements.

14. The system as set forth in claim 1, wherein the radial movement member has a plurality of bladders that are actuated by air.

* * * * *